United States Patent
Schmid

(10) Patent No.: US 6,669,588 B2
(45) Date of Patent: Dec. 30, 2003

(54) CONTINUOUSLY VARIABLE TRANSMISSION WITH INTEGRATED TORQUE SENSOR

(75) Inventor: Jochen Schmid, Alfdorf (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 10/029,126

(22) Filed: Dec. 20, 2001

(65) Prior Publication Data

US 2002/0111248 A1 Aug. 15, 2002

(30) Foreign Application Priority Data

Dec. 20, 2000 (DE) ............................. 100 63 500

(51) Int. Cl.[7] ..................... F16H 59/00; F16H 61/00; F16H 63/00
(52) U.S. Cl. ........................ 474/18; 474/17; 474/18; 474/28; 474/72; 474/19; 474/21; 475/211; 475/209; 475/45; 475/46; 475/48
(58) Field of Search .................. 474/17, 18, 28, 474/72, 19, 21; 475/211, 209, 45, 46, 48

(56) References Cited

U.S. PATENT DOCUMENTS

| | | | | |
|---|---|---|---|---|
| 4,619,629 A | * | 10/1986 | Shigematsu et al. | .......... 474/28 |
| 4,722,718 A | * | 2/1988 | Eugen | .......... 474/28 |
| 5,045,028 A | * | 9/1991 | Rattunde et al. | ............ 475/211 |
| 6,336,879 B1 | | 1/2002 | Schmid et al. | ................. 474/28 |

FOREIGN PATENT DOCUMENTS

| | | | | |
|---|---|---|---|---|
| DE | | 199 51 950 A1 | 5/2000 | |
| WO | | WO 91/07613 A1 | * 5/1991 | ............ F16H/61/00 |

* cited by examiner

Primary Examiner—Marcus Charles
(74) Attorney, Agent, or Firm—Alfred J. Mangels

(57) ABSTRACT

A continuously variable transmission including two pairs of conical disks of which one disk of each pair is axially movable toward and away from the other disk and having an endless loop member in the form of a belt that passes around each pair of disks and transfers torque between the pairs of disks. The axially movable conical disk includes a contact pressure chamber to move the disk axially by the application of hydraulic pressure. The movable disk also includes an integrated torque sensor that is operative for controlling the contact pressure between the disks of a pair of disks and the endless loop member as a function of the torque.

12 Claims, 3 Drawing Sheets

CONTINUOUSLY VARIABLE TRANSMISSION WITH INTEGRATED TORQUE SENSOR

BACKGROUND OF THE INVENTION

1. Field of the Invention

The present invention relates to a continuously variable, conical disk transmission with an integrated torque sensor. More particularly, the present invention relates to a continuously variable, conical disk transmission with an integrated torque sensor for controlling the contact pressure between the conical disks and an endless, torque-transmitting member that passes between two pairs of conical disks.

2. Description of the Related Art

A transmission of the type herein disclosed is described in German Patent Publication DE 199 519 50 A1 and will be explained in greater detail below with the help of FIG. 4, which shows a longitudinal section through parts of the transmission and shows its hydraulic control.

An input shaft 6, which is connected with an internal combustion engine by way of a starting clutch, for example, drives a hydraulic pump 8. The pump can be connected through a spool valve 10 with either a return 12 or, alternatively, with a conduit 14 that can be connected to an adjusting chamber, further described below, for adjusting a conical disk 4. A pressure relief valve 15 is arranged between the pump 8 and the spool valve 10. Pump 8 is connected by another line 16 to a pressure chamber that is further described below and that determines the contact pressure with which the conical disks 2 and 4 contact a loop member 18 that can be in the form of a chain. An adjustable conical disk of another pair of conical disks (not shown) has a corresponding pressure chamber that is also supplied with pressure through conduit 16.

The basic function of such a conical disk transmission mechanism, shown in the upper half of FIG. 4 at maximum conical disk spacing and in the lower half at minimum conical disk spacing, is known and will therefore not be described herein.

A generally conical seal support 20 is rigidly connected with the free end of a hollow shaft 5 that is integrally formed with the non-adjustable conical disk 2, and terminates in a cylindrical region 22. A fixed annular element 25 that is tightly connected with conical disk 4 is movable on a radially-outwardly-facing surface of seal support 20, between which an annular seal 24 is arranged. An annular sleeve 28 of conical disk 4 is sealingly guided on a radially-inwardly-facing cylindrical surface 26 of seal support 20, between which an annular seal is arranged.

Arms 32 (for example, three arms) that are distributed in a circumferential direction and that are rigidly connected to a sensing piston 34, extend through openings 30 or pockets in the conical region of seal support 20. At its radial inner end, sensing piston 34, which is generally cup-shaped, is axially movable on the outer periphery of hollow shaft 5. A cylindrical region extends from the radially-extending base of sensing piston 34, the outer surface of which is movably guided, and tightly engages a radially-inwardly facing surface of an annular ring 36 of seal carrier 20, between which an annular seal is arranged. The right front surface of annular ring 36, as viewed in FIG. 4, is formed as an approximately radially extending cam surface 38 that has a curved peripheral surface, opposite from which is positioned a further, approximately radially-extending cam surface 40 that has a curved peripheral surface, and that is carried on a curved extension 41 of the free end of sensing piston 34.

Cam surfaces 38 and 40 receive between them balls 42 that serve as rolling bodies and that determine the axial position of sensing piston 34.

For guiding balls 42, a concave guide surface 46 is formed on the outer side of an annular extension 44 on movable conical disk 4, that corresponds to a similarly concave and generally obliquely-extending guide surface 48 that is angled at its end, and that is formed on a sheet metal element 50 that is rigidly connected with conical disk 4.

Arms 32, which are formed as sheet metal parts, extend into an annular element 33 at their radially-outwardly-directed ends, and that is formed with a slide tooth system that meshes with a corresponding slide tooth system on a sleeve. The sleeve mates with the gears of an intermediate transmission assembly 54 that, in turn, is in meshing engagement with the rotationally driven drive shaft 6. Depending upon the operation of one of two clutches 55, the direction of rotation of conical disks 2 and 4 changes.

Two pressure chambers are formed between seal carrier 20 and conical disk 4—a radially inner contact pressure chamber 56 and a radially outer adjustment chamber 58. Adjustment chamber 58 is supplied with hydraulic medium from conduit 14 by way of bores formed in seal carrier 20 and a blind bore in drive shaft 6. Contact pressure chamber 56 is supplied with hydraulic medium pressure through an axial blind bore 60 in drive shaft 6 and radial bores. A radial bore serving as a return opening 62, is supplied with the pressure within contact pressure chamber 56 from within the annular ring 36, and is more or less widely pre-closed by sensing piston 34, and opens into a further axial blind bore in drive shaft 6.

The function of the torque sensor that is constituted by balls 42, annular ring 36, and sensing piston 34, all arranged together within contact pressure chamber 56, is as follows:

If only a weak torque is provided by drive shaft 6 and if sensing piston 34 is correspondingly loaded with only a weak torque by arms 32, the piston is found to be in its leftmost position, as viewed in FIG. 4, whereby the radial bore serving as a return opening 62 is substantially unblocked by sensing piston 34, so that the pressure in contact pressure chamber 56 is low.

If the torque increases, sensing piston 34 has the tendency to twist relative to conical disk 4 or relative to sheet metal component 50, whereby the sensing piston will shift toward the right due to the influence of balls 42 as they roll on the cam surfaces, thereby increasingly closing return opening 62, so that the pressure in contact pressure chamber 56 increases. In that way, the contact pressure of conical disks 2 and 4 against loop member 18 depends upon the torque.

At constant torque, by appropriate admission of hydraulic medium into adjustment chamber 58 there results an adjustment of conical disk 4 to the right (toward lower speed ratios or the speed of the conical disk transmission; loop member 18 thereby travels toward the outside), and thus balls 42 are shifted radially inwardly by guide surfaces 46 and 48. Because of the radially changing slope of cam surfaces 38 and 40 in the direction of the periphery, the pressure in contact pressure chamber 56 decreases.

From the above it is apparent that the contact pressure that acts on loop member 18 between conical disks 2 and 4 depends not only on the torque applied through the intermediate gear set 54, but also on the distance between the conical disks, and thereon depends the speed ratio of the transmission. That is adjusted in terms of a contact pressure that is sufficient for the given operating conditions but as low as possible, and that ensures a slip-free run of loop member 18 between conical disks 2 and 4, whereby the energy consumption is reduced and the life span is increased.

A characteristic of the above-described transmission consists in that balls 42 influence the prevailing pressure in the contact pressure chamber, corresponding to the speed of the transmission, and thereby the centrifugal force that acts on them, because they attempt to move radially outwardly along guide surfaces 46 and 48 as the rotational speed increases, and thereby exert an additional adjusting force on cam surface 40 of sensing piston 34. That results in an undesired speed dependence of the contact pressure. Furthermore, the movement of the balls along the guide surfaces is accompanied with distinct friction, which, depending upon the adjustment direction and the adjustment speed of the transmission ratio, causes an increase or decrease of the contact pressure, leading to undesired hysteresis.

SUMMARY OF THE INVENTION

The present invention is directed to providing a solution for the above-mentioned problem and to improving a belt-driven, conical pulley transmission of that type, so that the influence of centrifugal force on the contact pressure and the hysteresis characteristics is reduced.

That objective is achieved in accordance with the present invention.

In accordance with the invention, the ramps that are provided on the guide surfaces achieve, on one hand, that the movement of the balls along the guide surfaces depends less on direction, which reduces hysteresis. Furthermore, the ramps are formed in coordination with the cam surfaces in such a way as to reduce or to completely eliminate the influence of centrifugal force on the adjusting force that acts on the sensing piston, and thereby the contact pressure.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
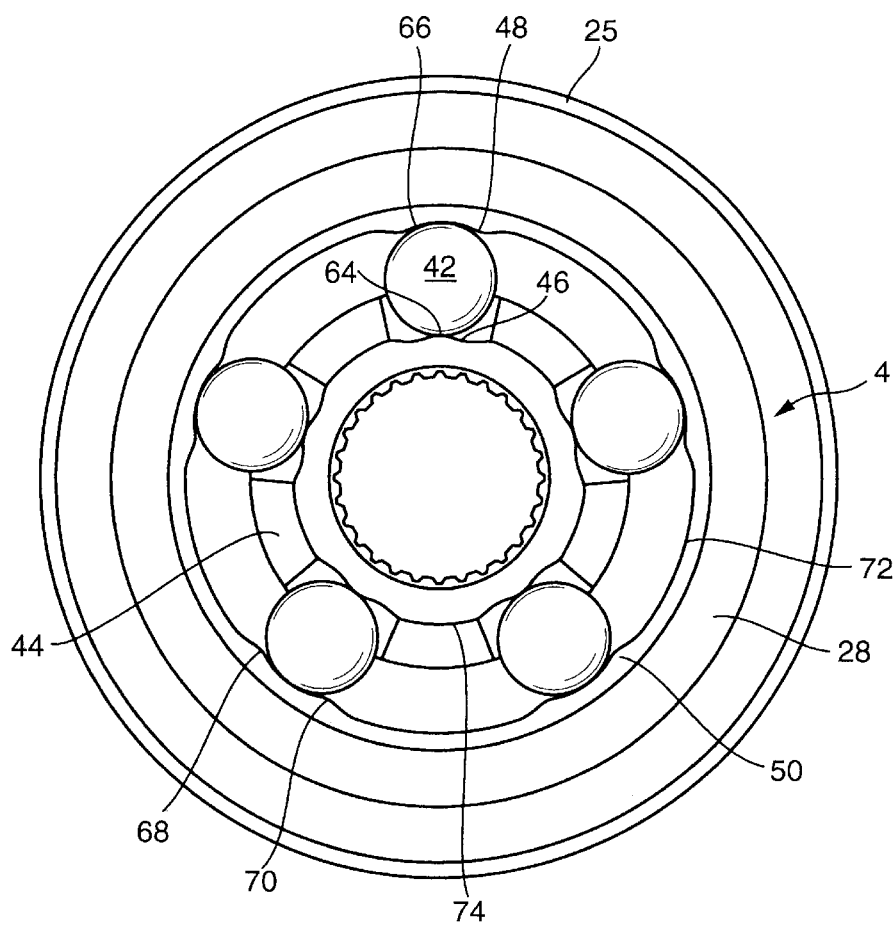
FIG. 1 is an end elevational view of an adjustable conical disk having guide surfaces as viewed in the direction of arrows A in FIG. 4.
Figure 2:
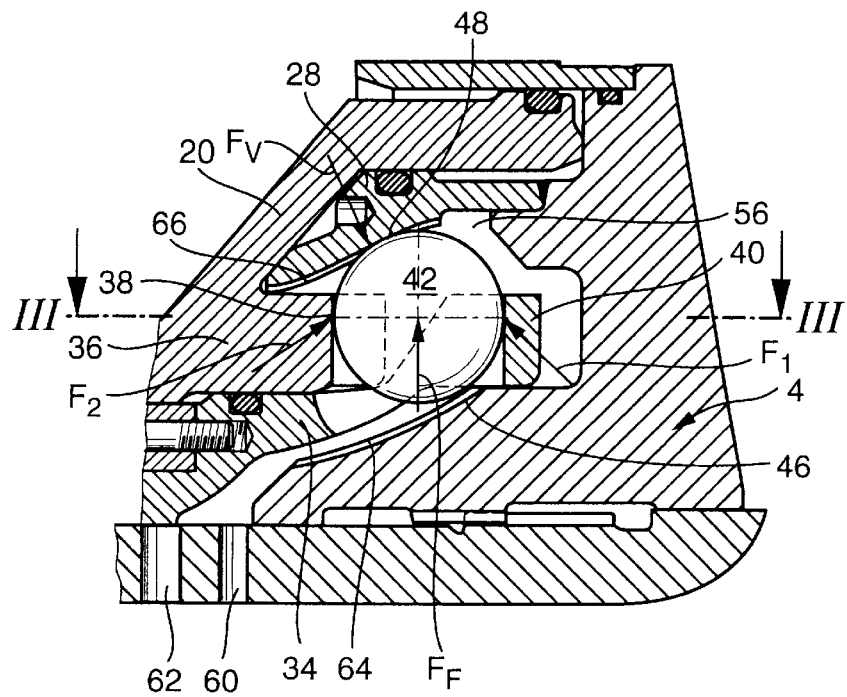
FIG. 2 is an enlarged, fragmentary, cross-sectional view in the region of a ball to illustrate the cooperative action of the guide surfaces and the cam surfaces.
Figure 3:
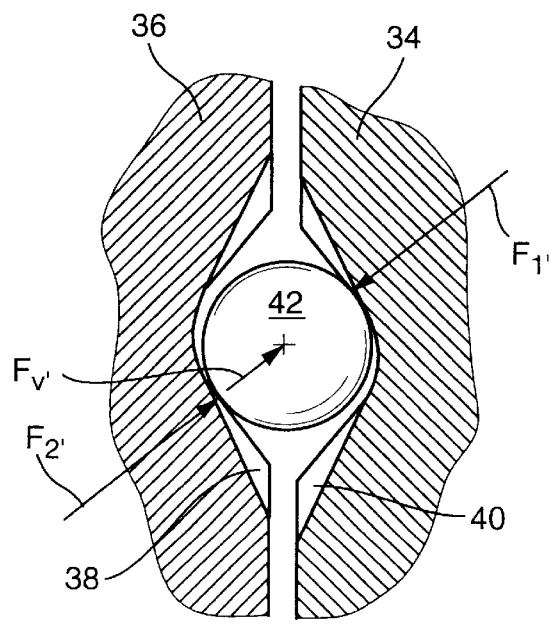
FIG. 3 is an enlarged, fragmentary, cross-sectional view taken along the line III—III of FIG. 2.
Figure 4:
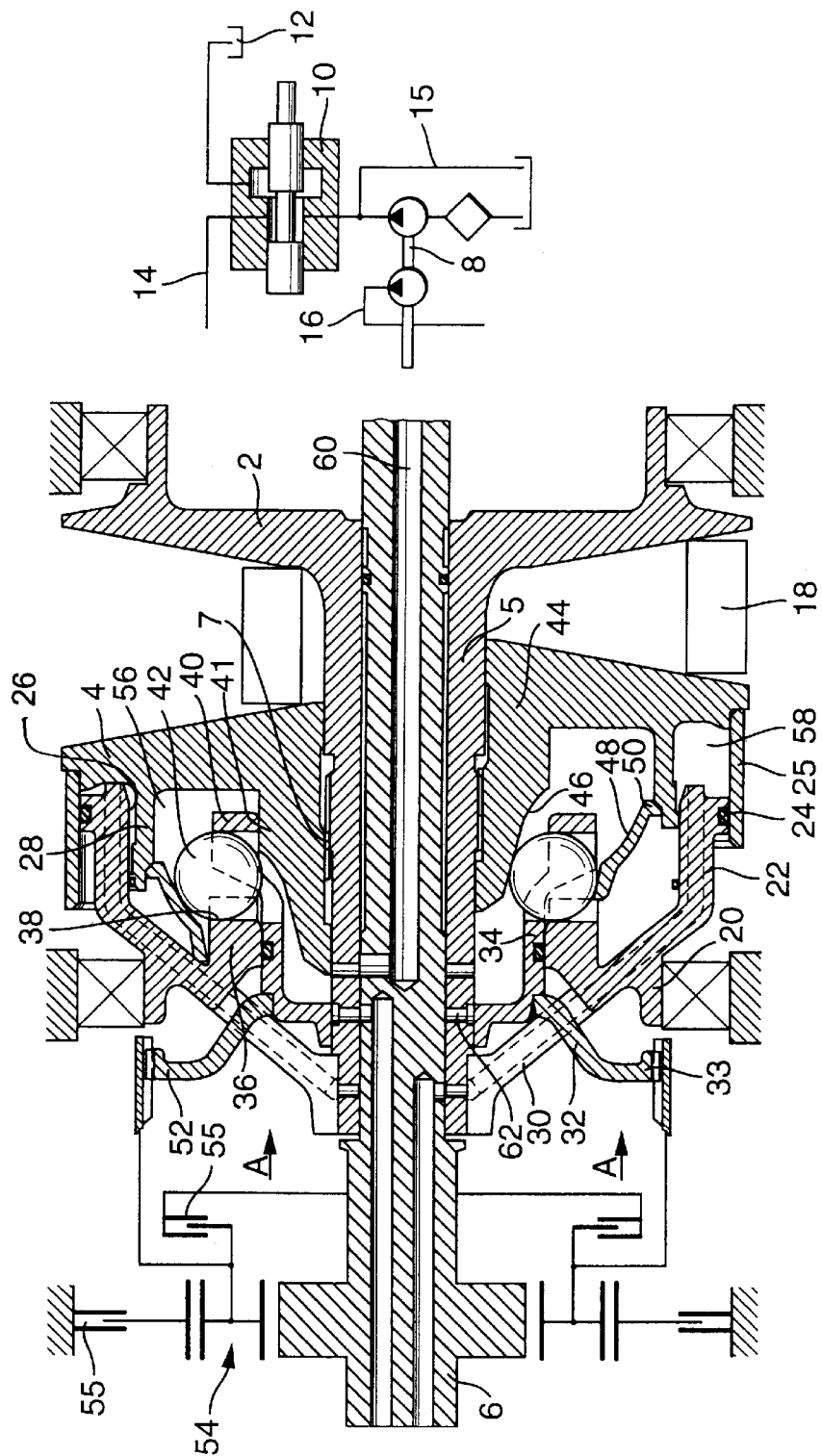
FIG. 4 is a longitudinal cross-sectional view through parts of a known belt-driven, conical pulley transmission including its hydraulic control.

Referring to the drawings, FIGS. 1 through 3 show detailed views of improvements to the transmission shown in FIG. 4 and that is described above, in which corresponding components are identified by the same reference numerals as in FIG. 4.

As shown in FIG. 1, guide surfaces 46 and 48 for balls 42 are formed on adjustable conical disk 4 and include ramps in the circumferential direction. More precisely, the radially inner, outwardly-facing guide surfaces 46 that are formed on annular extension 44 are each formed with a respective axially-extending raised portion 64. Guide surfaces 48 provided on sheet metal element 50 are formed by axially-extending depressions 66.

As is further apparent from FIG. 1, depressions 66 extend in the region of a radially-inwardly-facing annular surface 72 of sheet metal element 50 and include raised portions 68, 70 on each side. Correspondingly, raised portions 64 on inner guide surfaces 46 extend into depressions in regions of an outwardly-facing annular surface 74 of annular extension 44.

With the embodiment of guide surfaces 46 and 48 in accordance with the invention, the following results are achieved, as discussed below with reference to FIGS. 2 and 3.

When adjustable conical disk 4 is moved axially, and with it guide surfaces 46 and 48, balls 42 move radially corresponding with the inclination of guide surfaces 46 and 48. With a movement of conical disk 4 toward the right as viewed in FIG. 2, for example, there is developed a guide or adjusting force $F_v$ that acts on guide surface 48.

Because of the ramp-shaped form of guide surfaces 48 (and of guide surfaces 46 by reason of an opposite movement direction of conical disk 4), the line of application of the component $F_{v'}$ of adjusting force $F_v$ lies along a circumferential plane of the transmission that passes through the midpoint of ball 42 (cutting plane III—III in FIG. 2), as seen in FIG. 3, on the line of application of $F_{1'}$ and $F_{2'}$. Thereby, $F_{1'}$ and $F_{2'}$ are the components of the forces $F_1$ and $F_2$ that lie in the same circumferential plane, and that act on balls 42 from cam surfaces 38 and 40 (see FIG. 2).

As can be seen in FIG. 3, the adjustment force $F_{v'}$ does not alter the direction of $F_{1'}$. The direction of $F_{1'}$ influences the force with which sensing piston 34 is loaded toward the right, with reference to FIG. 4, and thereby the pressure in contact pressure chamber 56, or the contact pressure.

The force $F_{1'}$ that acts on cam surface 40 of sensing piston 34 bears against cam surface 38 through ball 42, and, depending upon the direction of adjustment and the rotational speed, on one of guide surfaces 46 and 48.

The amount of force $F_1$ is thereby distributed between the amounts of force $F_{2'}$ and $F_{v'}$. In a stationary condition (no axial adjustment of conical disk 4), the adjustment force $F_{v'}=0$, and therefore $F_{1'}=F_{2'}$. The direction of force $F_{1'}$ is independent of the adjustment force, and is dependent only on the torque that is transmitted by the pair of conical disks and on the ramp angles of cam surfaces 38 and 40.

The centrifugal force that is created, which depends on the mass of ball 42 and the rotational speed, is included in $F_{v'}$ and it has no influence on the direction of $F_{1'}$. Therefore, the influence of the centrifugal force of balls 42 is eliminated.

As described in connection with FIG. 1, the ramp shape of guide surfaces 46 and 48 changes into a coaxial form, thereby preventing too large a radial adjustment of balls 42 during a pumping process.

In summary, the invention is based upon the following considerations:

If the balls transmit only forces that are normal to ramp surfaces 48, 66 or 46, 64, then, in accordance with the design, there is a balance of forces between the peripheral force from the torque and the axial force from the adjusted pressure. That is the case when the guide surfaces are formed according to the invention in such a way that their force directions along a circumferential section coincides with the normal direction of the ramp surfaces.

Depending on whether a pulling or a pushing motion is transmitted, the guide surfaces must have differently directed angles.

Because the angles of cam surfaces 38 and 40 change depending upon the speed ratio, for an exact equalization it is also necessary for the angles of the guide surfaces to be changed in accordance with the speed ratio.

If additional frictional moments were transmitted during the contact of the ball with the drive side ramp surfaces, the balance of forces, and therefore the adjusted pressure, would be disrupted, since an additional moment is acting upon the input side of the ramp. That would be the case if the force exerted by the guide surface on the ball were not directed normal to the ramp surface.

Advantageously, guide surfaces 46, 48 and/or cam surfaces 38, 40 and/or the surfaces of balls 42 are manufactured by case-hardening of the respective surface areas. That is cost-effective and ensures a long life.

Alternatively, it is also possible to heat-treat or coat the surfaces referred to above in another manner to achieve a high quality. The components formed with the guide and cam surfaces can also be formed as forged parts, as cast parts, or as sheet metal parts, or they can be produced by machining processes.

The outer guide (annular sleeve 28), having guide surfaces 48, can be formed in one piece or in multiple pieces with adjustable conical disk 4. For example, it can be welded on, pressed on, or screwed on.

Guide surfaces 48 and 46 can be radially enlarged away from conical disk 4 (as shown) or narrowed.

Guide surfaces 46, 48, 64, 66 can have a constant slope in the circumferential direction, or they can have a slope that changes with the axial position of conical disk 4.

Ramp-shaped guide surface 48 can be formed on sheet metal component 50 by stamping.

Sheet metal component 50 can advantageously be eliminated by forming guide surface 48 directly on the correspondingly-elongated annular sleeve 28 of conical disk 4, as shown in FIG. 2, that can be formed in one piece with conical disk 4 or as a welded component.

There is thus provided a steplessly adjustable, belt-driven conical pulley transmission with an integrated torque sensor. The transmission includes two pairs of conical disks that are driven by a loop member and that are each non-rotatably connected to a respective shaft. Each pair of disks includes at least one axially-adjustable conical disk 4 and one torque sensor to influence the effective contact pressure in a contact pressure chamber 56 adjacent to an axially adjustable conical disk in dependence upon the torque that is transmitted by the endless loop transmission. The torque sensor includes balls 42 supported on two carrier surfaces 38, 40 that are formed on components 20, 34 that are movable in relation to each other and that include cam surfaces to transmit a torque that acts upon the conical disk. Two guide surfaces 46, 48 that are connected to the adjustable conical disk, receive the balls between them, and they determine the radial positions of the balls, so that, if a change in torque and/or an adjustment in the adjustable conical disk occurs, the components with the cam surfaces move as a result of movement of the balls relative to one another in a longitudinal direction of the cooperating surfaces 38, 40, 46, 48, to thereby adjust the contact pressure. Both guide surfaces 46, 48 are formed with circumferentially spaced ramps 64, 66 in such a way that the line of application for a force component $F_v$ of adjustment force $F_v$ is operative in a circumferential plane passing through the midpoint of the ball, and is produced by one of the guide surfaces. The adjustment force $F_v$ operative on the balls along the line of application in the circumferential plane of operative components $F_1$, $F_2$, that at least coincide forces $F_1$, $F_2$, that are operative on the balls from cam surfaces 38, 40.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as a waiver of independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A continuously variable transmission including a pair of side-by-side conical disks for transmitting torque, wherein one of the disks is axially movable relative to the other disk in response to a contact pressure applied through a pressure chamber associated with the movable disk, said transmission comprising: a torque sensor that influences the contact pressure in the pressure chamber, wherein the torque sensor includes balls that are positioned between a pair of cam surfaces that are formed on components that are movable relative to each other and that transmit a torque that acts on the movable disk; guide surfaces carried by the movable conical disk and that receive the balls between them and guide the balls radially so that as the position of the movable disk is adjusted the components carrying the cam surfaces move relative to each other as a result of movement of the balls along the guide surfaces, to thereby adjust the contact pressure; wherein at least one guide surface includes at least one raised portion to define a ramp so that a component of an adjustment force $F_v$ that operates on the balls in a circumferential plane passes through the center of the balls and substantially coincides with lines of application of force components $F_1$, and $F_2$, of forces $F_1$ and $F_2$ that are imposed on the balls by the cam surfaces.

2. A transmission in accordance with claim 1, wherein the guide surfaces are formed on annular surfaces so that the balls are received between a radially inner elevation on one guide surface and a radially outer depression on an opposite guide surface.

3. A transmission in accordance with claim 1, wherein surfaces contacted by the balls are case-hardened.

4. A transmission in accordance with claim 1, wherein radial outer guide surfaces are provided by a sheet metal component that is connected to the adjustable conical disk.

5. A transmission in accordance with claim 1, wherein the guide surfaces are carried by the adjustable conical disk.

6. A transmission in accordance with claim 1, wherein both guide surfaces include raised portions.

7. A transmission in accordance with claim 1, wherein the guide surfaces include a radially outer guide surface and a radially inner guide surface, and wherein the radially outer guide surface has a concave profile in cross section.

8. A transmission in accordance with claim 7, wherein the outer guide surface includes a pair of spaced, axially-extending depressions that extend inwardly toward the inner guide surface.

9. A transmission in accordance with claim 8, wherein the inner guide surface has a convex profile in cross section.

10. A transmission in accordance with claim 9, wherein the inner guide surface includes an axially-extending raised portion that extends outwardly toward the outer guide surface.

11. A transmission in accordance with claim 7, wherein the inner guide surface has a convex profile in cross section.

12. A transmission in accordance with claim 11, wherein the inner guide surface includes an axially-extending raised portion that extends outwardly toward the outer guide surface.

* * * * *